United States Patent

[11] 3,550,774

| [72] | Inventors | Gene Hirs<br>Birmingham;<br>Richard H. Wykoff, Livonia, Mich. |
|---|---|---|
| [21] | Appl. No. | 808,868 |
| [22] | Filed | Mar. 20, 1969 |
| [45] | Patented | Dec. 29, 1970 |
| [73] | Assignee | Hydromation Engineering Company<br>Livonia, Mich.<br>a corporation of Michigan<br>Continuation-in-part of application Ser. No.<br>723,446, Apr. 23, 1968, now abandoned,<br>and a continuation-in-part of 696,624, Jan.<br>9, 1968. |

[54] METHOD OF AND APPARATUS FOR FILTERING
13 Claims, 9 Drawing Figs.

[52] U.S. Cl.................................................. 210/67,
210/73, 210/80, 210/189, 210/195, 210/196,
210/269, 210/280
[51] Int. Cl...................................................... B01d 41/00
[50] Field of Search........................................... 210/67, 80,
81, 82, 195, 196, 189, 73, 269, 276, 279, 280

[56] References Cited
UNITED STATES PATENTS

| 1,574,558 | 2/1926 | Coe................................ | 210/189X |
| 2,612,966 | 10/1952 | Nicol............................. | 210/500X |
| 2,965,445 | 12/1960 | Goens et al..................... | (210/40UX) |
| 3,182,803 | 5/1965 | Chisholm........................ | 210/266 |
| 3,208,934 | 9/1965 | Kingsbury...................... | 210/269X |
| 2,799,394 | 7/1957 | Boogaard....................... | 210/73 |
| 3,333,694 | 8/1967 | Range............................ | 210/80 |

FOREIGN PATENTS

| 317,036 | 10/1918 | Germany. |
| 124,511 | 11/1901 | Germany. |

Primary Examiner—John Adee
Attorney—Settle, Batchelder and Oltman

ABSTRACT: A method and apparatus for rejuvenating a granular bed of filter medium containing an appreciable amount of dirt in the form of particles smaller than the medium granules. The medium and the dirt are formed into a slurry and the slurry is passed with appreciable flow velocity over a perforate separating element, a portion of slurry being withdrawn through the perforate element to remove part of the dirt. The remaining slurry containing the medium flows past the perforate element, and the bed is reformed for subsequent filter operations. The formation of the slurry is promoted by the use as the filter medium of granules of an organic polymeric material such as polyvinyl chloride, polyethylene, polystyrene, sawdust or the like, since such materials are light in weight and are obtainable in shapes readily susceptible to slurrying. The amount of liquid in the slurry and the number of cycles during which the slurry passes the perforate element are variable to vary the extent of cleaning of the medium. Also variable is the proportion of the slurry withdrawn through the perforate element.

PATENTED DEC 29 1970

INVENTORS.
GENE HIRS.
RICHARD H. WYKOFF.
BY
SETTLE, BATCHELDER & OLTMAN.

ATT'YS.

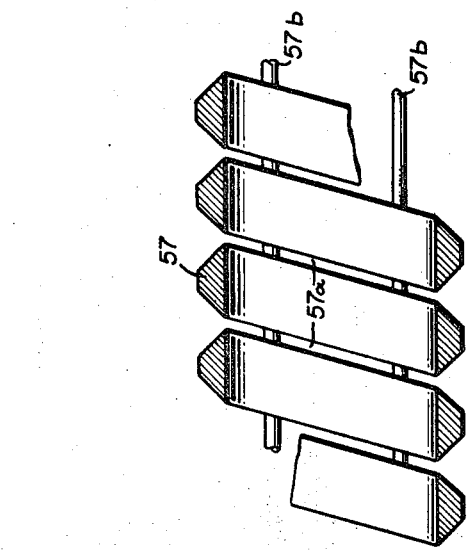
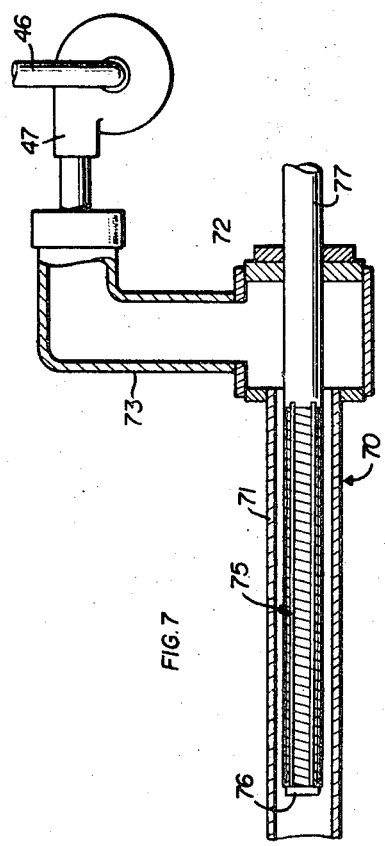
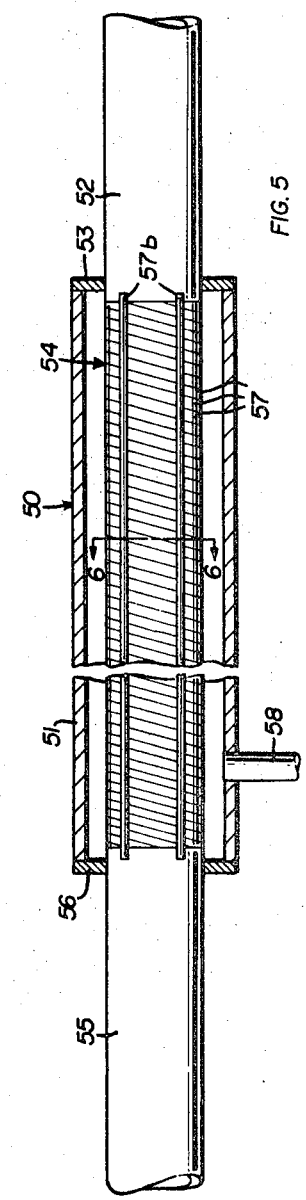

INVENTORS.
GENE HIRS.
RICHARD H. WYKOFF.
BY
SETTLE, BATCHELDER & OLTMAN.
ATT'YS.

METHOD OF AND APPARATUS FOR FILTERING

RELATED APPLICATIONS

This application is a continuation-in-part of the earlier filed patent applications of Gene Hirs and Richard H. Wykoff, Ser. No. 696,624, filed Jan. 9, 1968 in the U.S. Patent Office; and of Ser. No. 723,446, filed Apr. 23, 1968 now abandoned.

BACKGROUND OF THE INVENTION

In the above-identified earlier filed application, there was disclosed a method of and apparatus for filtering which utilizes as the filter medium an organic polymeric material, such as polyvinyl chloride, polyethylene, wood sawdust or the like. These materials are light, have great structural strength, and are of a size and shape capable of being formed into a slurry for cleaning.

By utilizing such filter media, it has been found that extremely high entrapped dirt loads can be built up in the medium prior to backwashing. For example, as much as 4½ pounds of iron oxide per cubic foot of filter medium can be retained in a particulate filter medium bed utilizing these materials. These extremely high dirt loads substantially complicate the backflushing or cleaning of the filter medium when necessary.

In our earlier application, various forms of backflushing mechanisms were provided. For example, one form of backflushing was provided by rotatable backflush headers embedded in the bed of filter material; another form of backflush utilized elongated stationary pipes embedded in the medium bed at varying levels; and a third form utilized mechanical agitators also embedded in the filter medium bed.

Also disclosed was a filter rejuvenation process whereby the filter medium and the dirt entrapped therein is formed into a slurry and transferred to a holding tank having a perforate wall through which the dirt and slurry liquid were removed from the filter medium, following which the filter medium was placed in a slurry in a clean liquid and then returned to the filter bed location.

The present invention now provides a new, novel and advantageous method of cleaning and rejuvenating the used filter bed which is somewhat similar to this last above-described technique.

SUMMARY OF THE INVENTION

The present invention now provides a filter medium cleaning technique and apparatus wherein a dirty filter bed of filter medium granules containing appreciable amounts of dirt is formed into a slurry, and flowed past a perforate screen or the like. The perforate screen has openings therein which will not pass the filter medium granules but which are larger than the dirt particles in the slurry and a portion of the liquid content of the slurry is drawn off through the screen, thereby removing the liquid and the dirt suspended therein.

Thus, in essence, the filter medium and the dirt load therein are flowed through a closed circuit after being placed in suspension or "slurryed" in a volume of diluent liquid. Since the mixed medium and the dirt are violently agitated during formation of the slurry, and the slurry, preferably, is passed through a centrifugal pump during its passage through the closed circuit, the "cake" formed of the dirt admixed with the filter bed granules is completely broken up and placed in liquid suspension, and the agitation in the slurry as it passes the screen aids in insuring the withdrawal of a predetermined proportion of the dirt with the withdrawn liquid.

Assuming that the filter bed is disposed in a tank having a capacity of 1,000 gallons and the slurry pump has a capacity of 1,000 gal. per min., the introduction of an additional 1,000 gallons of diluent liquid will reduce the solids concentration by 50 percent. The addition of an equivalent volume of the tank gives sufficient liquid to form the required slurry of filter medium, dirt and diluent liquid.

If the diluent liquid is withdrawn through the separating element at the rate of 500 gal. per min., then one-half of the liquid and one-half of the dirt in admixture therewith would be withdrawn during the first two minutes of cleaning time. The remaining slurry (after passage through the cleaning receptacle) now comprises 1,000 gallons, and 1,000 gallons of make-up liquid is added. Since one-half of the dirt load has already been withdrawn, the addition of another volume of diluent means that the dirt concentration is now one-fourth of what is originally was. If, during the next circuit past the cleaning element, 1,000 gallons of diluent water and the dirt suspended therein were drawn off, the slurry after passing the cleaning element now contains only one-quarter the amount of the original dirt.

If the removal of one-half of the dirt load of the filter medium constitutes the sufficient cleaning thereof, then only one circuit through the closed flow path would be required, and under the circumstances above outlined, the cleaning of the filter medium could be accomplished in two minutes. If the removal of three-fourths of the dirt is required to constitute rejuvenation of the filter medium, then four minutes would be required, and so forth for additional cleaning requiring an additional time.

While the instant application discloses several specific versions of the cleaning receptacle, many other variations are possible. Common to all these versions is the flow of the slurry of filter medium granules, dirt particles and liquid past the screen with appreciable velocity while a proportion of the liquid and that corresponding proportion of the dirt suspended therein is withdrawn through the screen.

It is, therefore, an object of the present invention to provide a new method of and apparatus for rejuvenating a granular filter medium containing appreciable amounts of accreted solid contaminants by placing the filter medium and contaminants in suspension in a diluent liquid, withdrawing from the suspension a portion of the liquid and the dirt suspended therein, and reforming the filter bed.

Another important object of the present invention is the provision of a method for rejuvenating a granular filter bed containing dirt particles by forming the filter medium granules and the dirt particles into a single slurry, thereby suspending the granules and dirt particles into a flowable mixture, separating at least part of the dirt from the flowable mixture and returning the granules to the bed location.

Yet another, and no less important, object of the present invention is the provision of an apparatus for rejuvenating the filter bed of filter medium granules containing solid contaminants in appreciable amounts, the apparatus including means for suspending the granules and the dirt in a diluent liquid, means defining a closed path in which the suspension is circulated from the bed location past a perforate cleaning element and back to the bed location, and means for withdrawing through the cleaning element a portion of the diluent liquid and the dirt suspended therein.

Still another object is the provision of the apparatus for cleaning a granular filter bed containing solid contaminants and including means for forming the bed and contaminants into a slurry, means for flowing the slurry through a closed path, a cleaning receptacle interposed in the path, a perforate separating element located in the cleaning receptacle and means for withdrawing through the perforate element a portion of the diluent liquid and the dirt suspended therein, but not the filter medium.

ON THE DRAWINGS

FIG. 5 is a sectional view with parts shown in elevation, taken along the plane 5–5 of FIG. 1;

FIG. 6 is a fragmentary sectional view taken along the plane 6–6 of FIG. 5;

FIG. 7 is a view similar to FIG. 6 showing a modified form of that portion of the apparatus of the present invention;

AS SHOWN ON THE DRAWINGS

Figure 1:
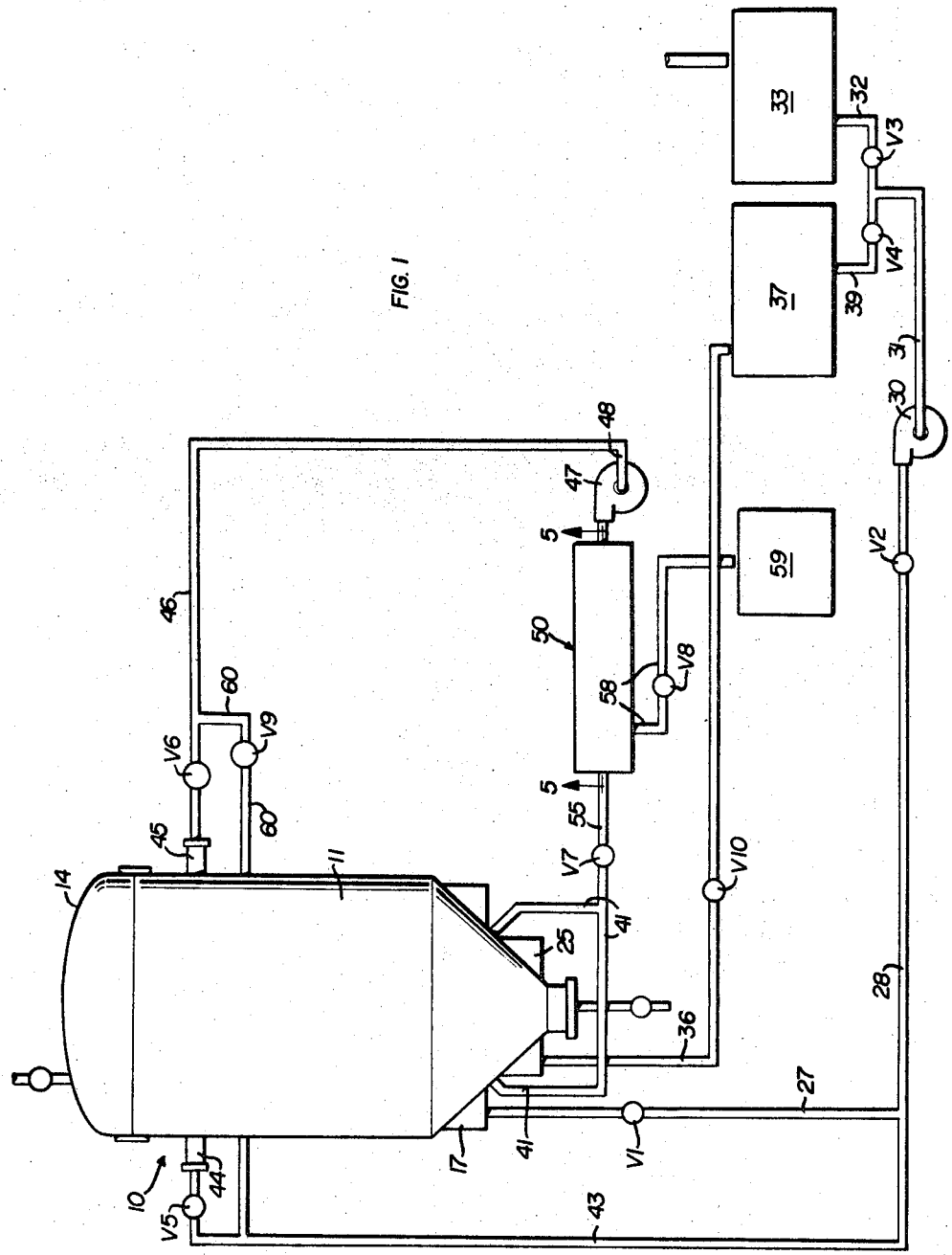
FIG. 1 is a schematic representation of a filter apparatus of the present invention capable of carrying out the filtering method of the present invention.
Figure 2:
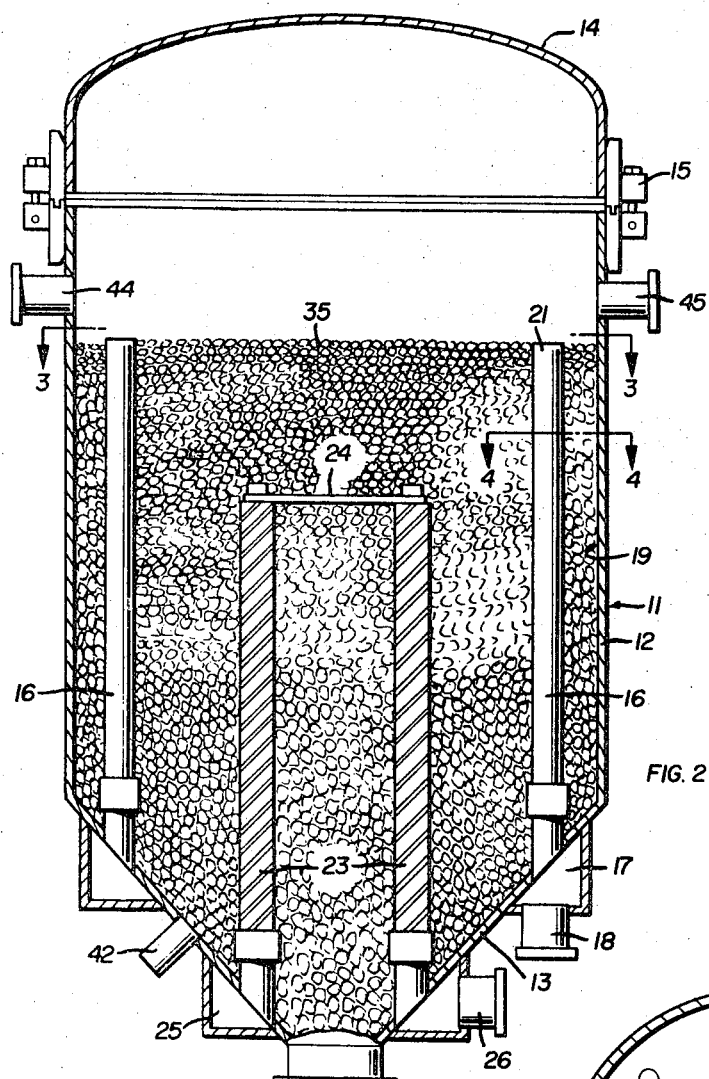
FIG. 2 is a vertical sectional view through a portion of the filtering apparatus of FIG. 1.

In FIG. 1, reference numeral 10 refers generally to the apparatus of the present invention and including a tank 11 which is illustrated in detail in FIG. 2. As shown in FIG. 2, the tank 11 comprises an open topped cylindrical body 12 and a conical bottom 13, the tank being surmounted by a domed cover secured to the body 12 by suitable means, as by clamping means 15. The bottom wall 13 of this tank 11 carries a plurality of peripherally arranged, individual inlet pipes 16 opening through the bottom wall 13 into a lower inlet chamber 17 provided with an inlet fitting 18 through which contaminated liquid is introduced into the interior 19 of the tank.

Figure 4:
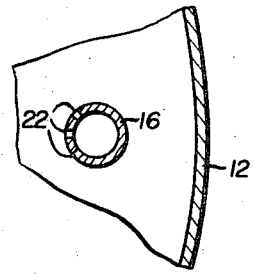
FIG. 4 is a fragmentary sectional view taken along the plane 4–4 of FIG. 2.
Figure 3:
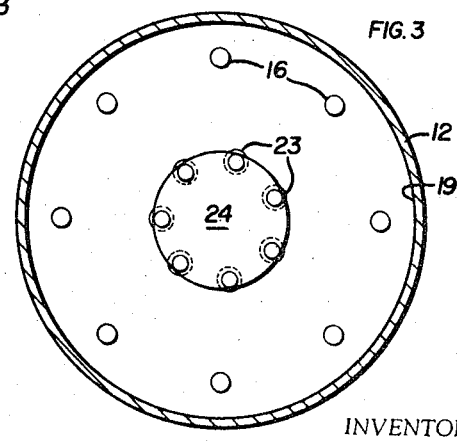
FIG. 3 is a sectional view taken along the plane 3–3 of FIG. 2.

The upper ends 21 of each of the pipes 16 is open, and the pipes 16 are provided with radial inlet openings 22 facing inwardly toward the center of the tank, as illustrated in FIG. 4. Inside the circular array of the inlet pipes 16 is a second circular array of outlet pipes 23. These pipes 23 also project upwardly from the bottom wall 13 of the tank, the pipes being stabilized at their closed upper ends by means of a support plate 24 joining the free upper ends of the pipes 23 as illustrated in FIG. 3 of the drawings. The interior of the pipes 23 communicate with an outlet chamber 25 located beneath the wall 13 of the tank, and clean liquid is discharged through a pipe fitting 26 communicating with the interior of the chamber 25.

The pipes 23 are formed of spirally wound wedge wire and are similar in construction and design to similar pipes described in our earlier identified application, and a detailed description of these pipes do not appear necessary at this time.

Referring again to FIG. 1 of the drawings, it will be seen that the inlet chamber 17 communicates through conduits 27 and 28 with the outlet of a pump 30 under the control of valves V1 and V2, respectively, the intake of the pump 30 being connected by conduit 31 and conduit 32 to a tank 33 containing contaminated or "dirty" liquid. Valve V3 located in the conduit 32 controls the flow of dirty liquid from the tank 33 through the conduits 32 and 31 to the intake of the pump 30, while valves V2 and V1 control the flow of contaminated liquid through the conduits 28 and 27 into the chamber 17 and hence to the inlet pipes 16 inside the tank 11.

Dirty liquid so introduced in the tank 11 flows through bed 35 of granular filter medium to the outlet or clean liquid pipes 23 and through the clean liquid compartment 25 and the fitting 26 through conduit 36 to a clean liquid tank 37. Since the inlet conduits 16 are open at their upper ends, the first flow of dirty liquid is into the upper reaches of the tank above the medium bed 35. Since the outlet conduits are located below the surface of the bed, the liquid will be filtered as it flows downwardly. After sufficient filtration has occurred to build up a pressure drop across the upper reaches, radial flow through the ports 22 will occur and this flow will continue. In this manner, the exposed upper surface of the bed 35 is also utilized as a filter surface. This is the normal operating cycle of the filter mechanism of the present invention when it is "on stream", i.e. when it is in filtering operation. The bed 35 of granular filter medium may be composed of any one of several granular materials. Preferably, these materials include polyvinyl chloride, polyethylene, polystyrene and other polymeric resinous materials or wood sawdust of a size and shape such as defined in our earlier above-identified application. As therein defined, the general body of particulate material suitable for this filter medium has a specific gravity of less than about 1.55, an average particle size in the range from 0.25 to 0.71 millimeters (or an average particle size in the range from 25 to 60 U.S. sieve number) and a porosity range of about 55 to 80 percent. The high porosity of such materials results in the filter medium having a relatively great capacity for retaining dirt or sludge, while the relatively fine particle size of the material makes it possible to provide a filter medium with less volume than known deep bed filters of the sand type. For example, the depth of the filter medium may be from 6 to 18 inches and a typical depth is 12 inches. Depth when measured in a bed of the type illustrated specifically in FIG. 2 of the drawings actually means the distance between the inlet pipes 16 and the outlet pipes 23.

Further, the particles are preferably of substantially uniform size, although the shapes may very substantially. Polyvinyl chloride particles which are grown to size in an emulsion are preferred, inasmuch as they are spherical or oval in shape with a pockmarked surface something like cauliflower or popcorn. Foamed particles of polystyrene also may be utilized, such particles being roughly spherical in shape. Polyethylene particles, since they are prepared by shredding larger particles such as quarter inch cubes, are in the nature of shavings and the predominant shape is elongated, i.e. pencillike, stringlike and needlelike. The lightness of all of these particles, including the platelike particles of sawdust, adds to the "slurrying" capabilities of the bed 35.

Such materials are "organic" in nature, being carbon compounds which are complicated synthetic or naturally essentially polymeric structures, in contrast to such previously used deep bed filter media as coal, sand, and the like.

As above explained, the filter medium bed 35 has a tolerance for contaminant particles which results in its becoming very heavily loaded with dirt while still remaining permeable to the flow of the liquid therethrough. However, bed 35 will eventually become loaded with contaminant particles, and it is necessary to rejuvenate the bed. The necessity for such rejuvenation may be signaled by the rise in back pressure in the space above the bed 35, or by other suitable means, such as the lapse of time, measuring flow from the tank, or the like. When such rejuvenation becomes necessary, valve V3 is closed and the supply of dirty liquid to the pump 30 is thereby interrupted. Valve V10 is closed, as is valve V1 to interrupt normal filtering flow through the tank 11. Valve V4 interposed in a conduit 39 interconnecting the clean liquid tank 37 and the conduit 31 then is opened, as is the valve V5 which interconnects inlet line 28 and conduit 43 which leads to an additional inlet port 44 communicating with the interior of the tank 11 at the upper region thereof. At the same time, upper outlet valve V6 is opened to accommodate the egress of liquid through bypass conduit 46 and intake line 48 to the cleaning pump 47. Valves V7 and V8 are opened, so that bypass flow from the pump 47 enters the tank 11 through inlet lines 41.

As a result of the flow of the liquid from the pump 30 through the upper inlet connections 43 and 44, and the injection of bypass liquid from the pump 47 through the lower inlet openings 42, diluent liquid is introduced into the filter tank 11 under high pressures and in such volume as to first expand the filter bed 35 and then to suspend the filter bed 35 and the dirt embedded therein into a slurry, the liquid and the admixed solids therein rising up beneath the dome 14 and expanding and agitating the bed to form the slurry.

This slurry exits through the outlet connection 45 located in the upper regions of the tank sidewall 11 above the normal level of the bed 35, and the slurry passes through the tank outlet pipe 46 through the intake of the bypass or slurry pump 47 through the intake conduit 48. The slurry passes through pump 47, which is of centrifugal type, so that the slurry again is agitated and broken again into individual filter medium granules and dirt particles suspended in the diluent liquid from the tank 37.

The slurry issues from the pump 47 into a cleaning receptacle indicated schematically at 50 in FIG. 1 and illustrated in detail in FIGS. 5 and 6 of the drawings. More particularly, the cleaning receptacle 50 comprises an outer, closed and enlarged conduit 51 which concentrically surround the pump outlet pipe 52 and is sealed thereto by an end wall 53. The pump outlet pipe 52 has secured thereto a cylindrical screen 54 formed of wedge wire and having essentially the same inside diameter as the inside diameter of the pipe 52. A withdrawal conduit 58 communicates with the space between the enlarged conduit 51 and the wedge wire conduit or screen 54, while the output end of the wedge wire screen 54 communicates with a return conduit 55 which again is sealed to the separating compartment by end wall 56. The return conduit 55 communicates through valve V7 with the branched backflush conduits 41, so that the slurry passing through the wedge wire conduit 54 returns to the interior of the tank 11 through the fittings 42 heretofore described.

As illustrated in FIG. 6 of the drawings, the wedge wire conduit 54 is made of wedge-shaped wire 57 which is spirally wound at very accurately spaced intervals and retained in position by axially extending rods 57b welded or otherwise secured to the wire 57. The assembly 57, 57b provides apertures or perforations 57a therein in the form of spiral slots, the width of the perforations being larger than the size of the dirt particles suspended in the slurry. As the slurry passes through the pump output pipe 52 and through the wedge wire conduit 54, a given portion of the liquid is withdrawn through the pipe 58 and passes through valve V8 to the receptacle 59 for settling. Since the filter medium granules are so large as to be intercepted by the wedge wire and the velocity of flow tends to carry the granules along the wedge wire, only the liquid and the dirt suspended therein will be withdrawn through the conduit 58. By manipulation of the adjustable valve V8 or by varying the size of the conduit 58 or by other suitable means, the proportions of liquid so withdrawn can be adjusted as desired. Typically, 50 percent of the liquid flowing through the wedge wire 54 will be withdrawn through the conduit 58.

The pump 47 flows the liquid through line 52 and past the screen element 54 with appreciable velocity and with an amount of kinetic energy sufficient to keep the granules flowing past the apertures. The withdrawing of liquid through the screen openings is due to the difference in pressure across the openings. Further the granules present a much larger surface area to the liquid flow than do the smaller dirt particles. The granules tend to be swept along with the liquid flow and to pass the wedge wire slots 57a, due to (1) the larger granular size and (2) the high velocity flow of granules. The forces on the granules are vectorial in nature. The velocity vector along the length of the tubular screen being from 5 to 10 times as great as the radial flow vector tending to pull a granule through the slots 57 a. It has been found that a perforate opening (such as the slot 57a) of from 0.015 to 0.018 inch will not allow granules of a size of from 0.010 to 0.012 inch to pass therethrough at flow velocities exceeding 10 feet per second. Thus, the size of particles passing through the perforate surface is a function of both apertures size and particle velocity. The slot size need not be less than the granule size. The advantages of increased volume flow through the slots without fear of granule loss will be evident, since the volume flow increases as the square of the slot opening size. By balancing the factors of aperture size and particle velocity, the greatest cleaning effect can be obtained with minimum probability of granule loss, since the perforate element has perforations of a size to prohibit the passage of said medium therethrough while accommodating the passage of liquid and admixed dirt therethrough.

Thus, it will be seen that the filter medium granule component of the slurry passes through the closed path defined by the conduit 46, pump intake conduit 48, the pump 47, the pump output conduit 52, the separation receptacle 50, the output conduit 55 and the branch inlet pipes 41 back to the tank 11, while a portion of the liquid phase of the slurry and the dirt suspended in said portion is withdrawn from the receptacle through the conduit 58 and the adjustable valve V8. In this manner, a separation of dirt from filter medium granules is affected at the receptacle 50.

Once a sufficient amount of dirt has been separated from the slurry, the valves V5 and V6 are closed and valve V9 in bypass line 60 is opened. As a result, the output of the pump 30 bypasses the tank, and the slurrying stops. Bypass flow through the conduit 43 and the bypass conduit 60 and valve V9 purges any slurry remaining in the line 46, the conduit 48, the pump 47, the receptacle 50 and conduits 55 and 41. After a sufficient period of time has elapsed to purge the conduits of any slurry, the pump 47 is stopped, valves V7, V8 and V9 are closed, and normal filtration operation is resumed by opening valves V1, V3 and V10 and closing valve V4.

In the modified form of the invention shown in FIG. 7 of the drawings, reference numeral 70 refers to a different dirt separation receptacle which comprises an enlarged outer conduit 71 receiving the slurry of mixture of medium dirt and liquid from an inlet 72 communicating with the output of the pump 47 through conduit 73. Disposed coaxially in the conduit 71 is a wedge wire conduit 75 which is essentially the same as the conduit 54 illustrated in FIG. 5 of the drawings. The conduit 75 is closed at one end, as by a plug 76, and communicates at its other end with a drainage line 77.

The slurry flowing through the enlarged conduit 71 flows into the conduit 55 heretofore described. A portion of the liquid phase of the slurry is withdrawn through the line 77, this portion containing a proportionate share of the dirt, as heretofore described. Preferably, orientation of the wedge wire in the element 75 is reversed to that illustrated in FIG. 6 of the drawings so that there is no tendency for the dirt particles to wedge between the adjacent wedge wires 76. Otherwise, the operation and function of the embodiment of FIG. 7 is the same as the embodiment of FIG. 5.

Figure 8:
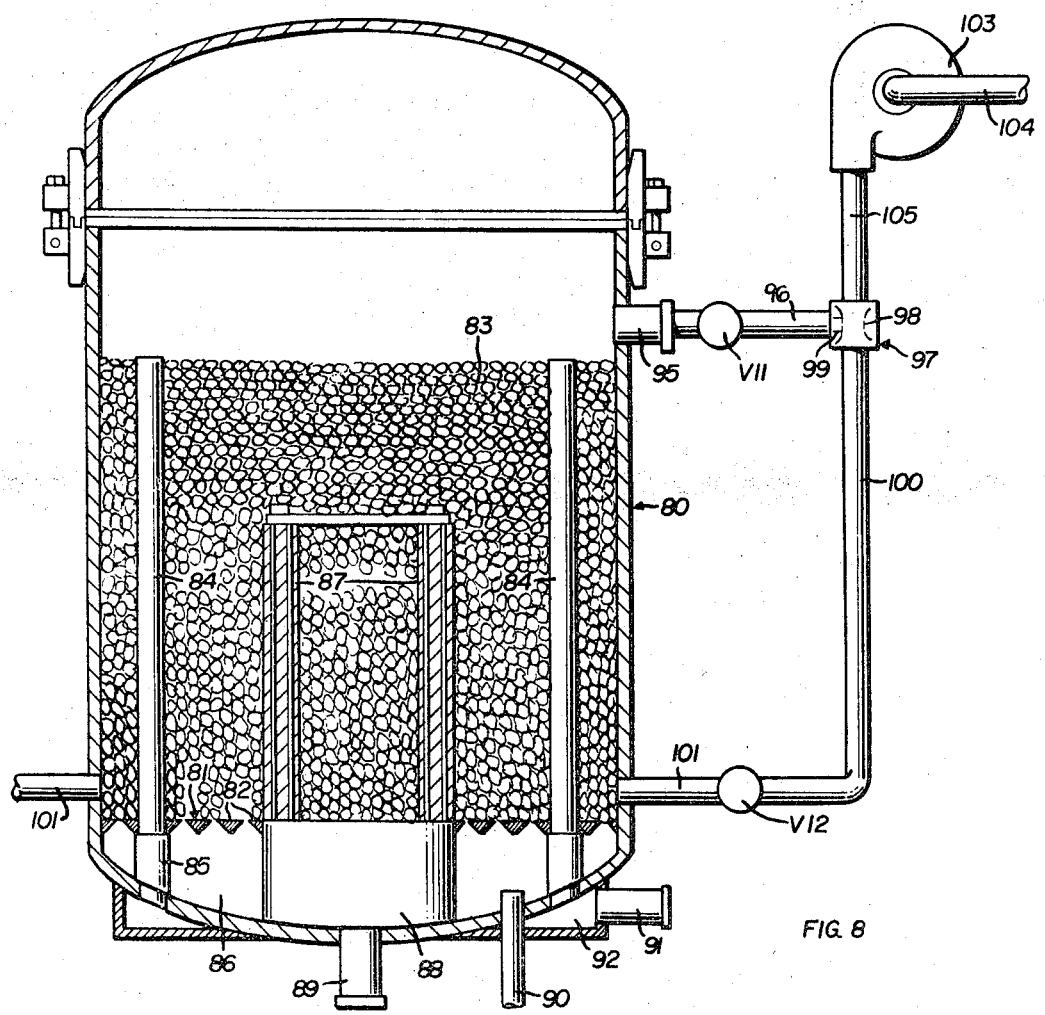
FIG. 8 is a view similar to FIG. 2, but illustrating a modified form of the invention.

As shown in FIG. 8 of the drawings, a tank 80 is provided of substantially the same configuration as the tank 11 earlier described, with the exception that the tank 80 is provided with a lower perforate opening 81 consisting of wedge wire or the like structural elements 82 which are closely spaced to define slots therebetween. The body 83 of filter medium is supported on this raised floor 81.

The inlet pipes 84 are substantially the same as the inlet 41 of FIG. 1 with the exception that they are provided with imperforate lower portions 85 transversing the chamber 86 provided beneath the floor 81. The outlet pipes 87 are substantially the same as the outlet pipes 23 of FIG. 2, with the exception that these pipes surmount a lower enclosed outlet chamber 88 isolated within the compartment 86 and having an outlet port 89 communicating with the clean water conduit 36 of FIG. 1. A drain line 90 communicates with the compartment 86.

The operation of the device of FIG. 8 in normal operation will be readily appreciated, dirty liquid entering through the inlet coupling 91 will flow through the inlet chamber 92 into the pipes 84 for flow through the body of filter medium 83, clean water exiting through the pipes 87, the chamber 88 and the outlet line 89 for flow to the clean water tank 37.

A filter medium rejuvenation mechanism is provided which includes an upper outlet 95 communicating through conduit 96 having valve V11 therein with an eductor 97 having its throat 98 communicating, as at 99, with the conduit 96. A bypass conduit 100 communicates with the interior of the tank 80 through line 101 located closely above the wedge wire 81 and provided with valve V12. Several such conduits 101 may be provided to provide spaced inlets immediately above the wedge wire 82. A centrifugal pump 103 receives liquid through an inlet line 104 and discharges through outlet conduit 105 into the eductor 97.

When it is desired to rejuvenate the filter medium, the pump 103 is started after the normal inlet and outlet lines to the tank 80 have been closed. Pump flow through the conduits 100 and 101 agitates the bed of medium 83, and the resulting flow of diluent liquid will result in the slurrying of the bed 83 in the liquid. The eductor 97 draws this slurry from the tank 80.

The resultant circulation of the slurry through the conduits 96, 100 and 101 will create a high velocity flow across the wedge wire 82. By withdrawing through the screen 82 and the line 90 a proportion of the liquid from the slurry as it flows over the wedge wire 82, a portion of the liquid and the dirt suspended therein will be withdrawn. Thus, the rejuvenation of the filter bed 83 proceeds in much the same manner as the earlier described embodiments of the invention with the exception of the fact that a cleaning receptacle exterior to the tank 80 is not required.

Once sufficient liquid has been withdrawn through the line 90 to remove the desired portion of the dirt, the pump 103 is stopped, valves V11 and V12 are closed, and flow through the line 90 is stopped. Upon again introducing dirty liquid through chamber 92 and the inlets 84 and withdrawing clean liquid through the outlet 87 and line 89, normal filter operation is resumed.

Figure 9:
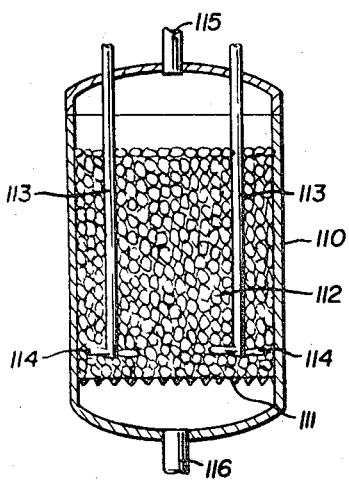
FIG. 9 is a view similar to FIG. 8, but illustrating still another modified form of the present invention.

Turning now to FIG. 9 of the drawings an even simpler version of the present invention is provided. Here, a tank 110 is provided with an interior wedge wire support 111 above which a body of filter medium 112 is supported. Disposed in the bed of filter material 112 are vertically extending shafts 113. Each such shaft 113 is provided at its lower end with an agitator blade 114, the shafts being driven for rotation by appropriate means (not shown).

The tank is provided with an upper inlet 114 for dirty liquid and a lower outlet 116 for clean liquid. Filtration thus occurs throughout the entire depth 112 during normal filtration flow.

After the bed 112 of filter medium becomes clogged with dirt, the outlet 116 is connected to a receptacle, such as a receptacle 59 of FIG. 1, while the flow of liquid through the inlet 115 continues. Upon rotation of the shafts 113, the bed 112 will be suspended in this liquid and will be formed into a slurry, the withdrawal of liquid through the wedge wire 112 and out through the outlet 116 will withdraw dirt in admixture with the liquid from the slurry. The number and size of the agitators 114 can be varied, but the formation of the bed 112 into the slurry is promoted by the fact that the filter medium hereinbefore disclosed are light in weight and easily suspended in liquid.

After sufficient liquid has been withdrawn to reduce the dirt content of the slurry to the desired level, the outlet 116 is reconnected to the clean liquid tank and rotation of the shafts 113 is ceased. Continued inflow of dirty liquid through which inlet 113 will result in reinitiated filter operation.

It will be noted that in each embodiment of the present invention the liquid which is introduced during rejuvenation of the slurry is truly a "diluent liquid" which may be either clean liquid or the dirty liquid normally introduced into the tank for filtration. In the event "dirty" liquid is utilized, the concentration of the contaminants therein will be so much less than the concentration of the dirt in the slurry that even dirty liquid is a "diluent" as herein defined.

We claim:

1. In a filtration apparatus having a tank provided with means for the ingress of dirty liquid and the egress of clean liquid and a bed of filter medium granules of an organic polymeric material having a specific gravity of less than about 1.55 in said tank interposed between said ingress means and said egress means, the improvements comprising an additional outlet opening for said tank, a flow-through receptacle having an inlet communicating with said opening to receive from said tank a slurry of liquid containing both filter medium granules and dirt particles earlier entrapped in said bed, said receptacle having a first outlet and a second outlet, a cylindrical flow element disposed in said receptacle and having a perforate peripheral surface exposed to the passage of the slurry axially therealong as the slurry flows from the inlet to the first outlet, and said second outlet being isolated from both said inlet and said first outlet by said flow element, said flow element perforations being of a size to prohibit the passage of said granules therethrough as the slurry flows through the receptacle but accommodating the passage of liquid and admixed dirt particles through, drainage means connected to said second outlet to accommodate the withdrawal of a portion only of said liquid and admixed dirt from said slurry and through said perforations, passage means connecting the first outlet with the tank for returning to said tank that portion of said slurry not so withdrawn and including medium, and a pump for flowing said slurry as a continuously moving stream through the flow path defined by said tank, said first outlet, said receptacle, said flow element and said passage means.

2. In a method of filtering solid contaminant particles from a dirty liquid by passing the dirty liquid through a bed of filter medium granules formed of a synthetic organic polymeric material, the contaminant particles being appreciably smaller than the granules, the improvement of renewing the bed of granules after the accretion of an appreciable amount of contaminant particles therein by the steps of; injecting diluent liquid into said bed to form a flowable mixture of granules and particles in the liquid; flowing the mixture under pressure in a continuous stream through a closed flow path from the location of the bed through a renewal compartment and back to the location of the bed; flowing the mixture as it passes through said compartment past a perforate element having perforations larger than the particles but incapable of allowing passage of said granules as suspended in the continuous slurry stream; and exhausting from said compartment and through said perforations a part only of said mixture, said part of said mixture comprising diluent liquid and those particles suspended therein.

3. In a method of filtering solid contaminant particles from a dirty liquid by passing the dirty liquid through a bed of filter medium granules of organic polymeric materials having a specific gravity of less than about 1.55, the particles being appreciably smaller than the granules and of greater specific gravity, the improvement of renewing the bed of granules after the accretion of an appreciable amount of contaminant particles therein by the steps of; injecting diluent liquid into said bed to form a flowable mixture of granules and particles in the liquid; flowing the mixture at an appreciable velocity past a perforate element; and exhausting through said perforations a part only of said mixture, said part of said mixture comprising diluent liquid and those particles suspended therein, but not granules because of the velocity imparted to the slurry.

4. In the method as defined in claim 3, the further improvement residing in circulating said flowable mixture substantially in situ and in a closed circulation path past said perforate element while exhausting said part of said mixture.

5. In the method as defined in claim 4, the further improvement residing in flowing said mixture from the location of said bed through a circulation path past the remotely located perforate element through which said part of said mixture is exhausted.

6. In a method of renovating a bed of granular synthetic polymeric low-density filter medium having distributed therethrough a substantial amount of solid contaminants as the result of flowing contaminated liquid through said bed, the steps of suspending the bed including both the medium and the contaminants in a liquid to form a slurry, flowing the slurry in a continuous stream and at a substantial velocity through a flow path back to the bed location, positioning adjacent the path of slurry flow a perforate surface having openings therein larger than the contaminant solids and incapable of accommodating the flow therethrough of said medium granules at the velocity of slurry flow, while withdrawing through said surface of part only of the liquid and those contaminant solids suspended therewith, maintaining in said slurry flow path and returning to the location of said bed the remainder of the slurry including the medium granules, and reforming said bed at said location.

7 In a filtration apparatus wherein a bed of granular filter medium of synthetic polymeric material having a specific gravity of less than about 1.55 is disposed in a tank having means for the ingress of dirty liquid into the tank and the egress of clean liquid from the tank with dirt from the dirty liquid being entrapped in said bed, means for rejuvenating said bed comprising a closed compartment located outside said tank and having a single inlet for a slurry of liquid containing granular filter medium and dirt and a pair of spaced outlets, a perforate element located in said compartment, said perforate element having perforations providing the sole connection (1) between said one outlet and said inlet and (2) between said one outlet and the other of said outlets, said perforations being of a size to prohibit the passage of said medium therethrough while accommodating the passage of liquid and admixed dirt therethrough, means for forming said bed into said slurry, pump means for conducting the slurry as a continuous stream from said tank through said compartment and back to said tank, the slurry flow being through said single inlet and past said perforate element to the other of said outlets, a drainage means connected to said one of said outlets to accommodate the withdrawal of a portion only of said liquid and admixed dirt from said slurry stream by passage through said perforate element, and passage means connected to the other of said outlets for returning to said tank that portion of said slurry stream not so withdrawn and including said medium.

8. In a method of operating a filter to remove solid contaminants from a liquid by flowing contaminated liquid through a bed of filter medium granules, said granules formed of organic polymeric material having a density of less than 1.55 and a particle size ranging from about 0.25 to about 0.71 millimeters and a porosity of from about 55 to 80 percent, the improvements of renovating said medium bed after the removal of a substantial amount of solid contaminants which are distributed through the bed, said solid contaminants being particulate and generally of a size appreciably less than the size of the granules and of a density greater than 1.55 by the steps of suspending the medium and the contaminants in the liquid to form a slurry, flowing the resultant slurry at an appreciable velocity and in a closed flow path past a perforate surface having openings therein larger than the contaminant solids and larger than about 0.25 millimeters, flowing through said surface a part of the liquid containing only contaminant solids therein, the differences in size and density between the solids and the granules and the velocity flow of the granules past said perforate surface preventing the passage of granules through said surface with said part of said liquid, and discarding said part of said liquid.

9. In a method as defined in claim 8, the further improvements of removing said slurry from the location of the bed, flowing the slurry axially along a tubular perforate surface remote from the location of the bed, withdrawing radially through the perforate surface a part of the liquid and those contaminant solids therein, and returning the remainder of the slurry to the bed location.

10. In a filtration apparatus wherein a tank contains a body of finely divided synthetic polymeric granules of relatively low density, the tank having an inlet for dirty liquid and an outlet for clean liquid separated by at least a part of said body, the improvements residing in a cleaning mechanism for removing accreted dirt particles from said body, said dirt particles being generally smaller and more dense than said granules, and comprising means defining a closed circulatory path including at least a part of said tank, means for circulating in said path at a appreciable velocity and as a continuous stream a slurry of liquid, dirt and granules, a perforate surface defining a portion of said path of slurry flow, said surface having perforations therein of a size to allow the flow therethrough of liquid and dirt particles but not of said granules due to the differences in size and density of the dirt particles and the granules and the velocity of the granules as the slurry flows past said surface and means for withdrawing from said path of slurry flow and through said surface a portion only of said liquid and the dirt admixed therewith.

11. In a filtration apparatus as defined in claim 10, the further improvement wherein said perforate surface is tubular, the slurry flows axially along the perforate surface, and liquid and admixed dirt are withdrawn radially through the perforate surface.

12. In a filtration apparatus as defined in claim 10, the further improvement wherein said perforate surface is substantially planar and the slurry flows across the substantially planar surface thereof as the slurry circulates in said path.

13. In a filtration apparatus wherein a tank contains a body of finely divided synthetic polymeric granules of relatively low density, the tank having an inlet for dirty liquid and an outlet for clean liquid separated by at least a part of said body; the improvements residing in a cleaning mechanism for removing accreted dirt from said body and comprising a cleaning receptacle located outside the confines of said tank; an inlet conduit leading from said tank to said receptacle; a first outlet conduit leading from said receptacle to said tank; a second outlet conduit leading from the receptacle to waste, a pump for circulating as a continuous stream and at an appreciable velocity a slurry of liquid, granules and dirt in a circulatory path including said inlet and said first outlet conduits, said receptacle and said tank; a tubular element located interiorly of said receptacle and having its axis aligned with the direction of flow of said slurry through said receptacle, said tubular element having a perforate peripheral wall seperating said second outlet conduit from said inlet conduit and said first outlet conduit, the direction of flow of said stream of slurry circulated by said pump being along the surface of said peripheral wall; and means for accommodating the flow of a portion only of said slurry radially through said perforate element, said perforate element having the perforations thereof sized to prevent the flow of granules therethrough as the slurry in its circulatory path traverses the element, but accommodating the flow of liquid and admixed dirt therethrough.